United States Patent Office 2,746,708
Patented May 22, 1956

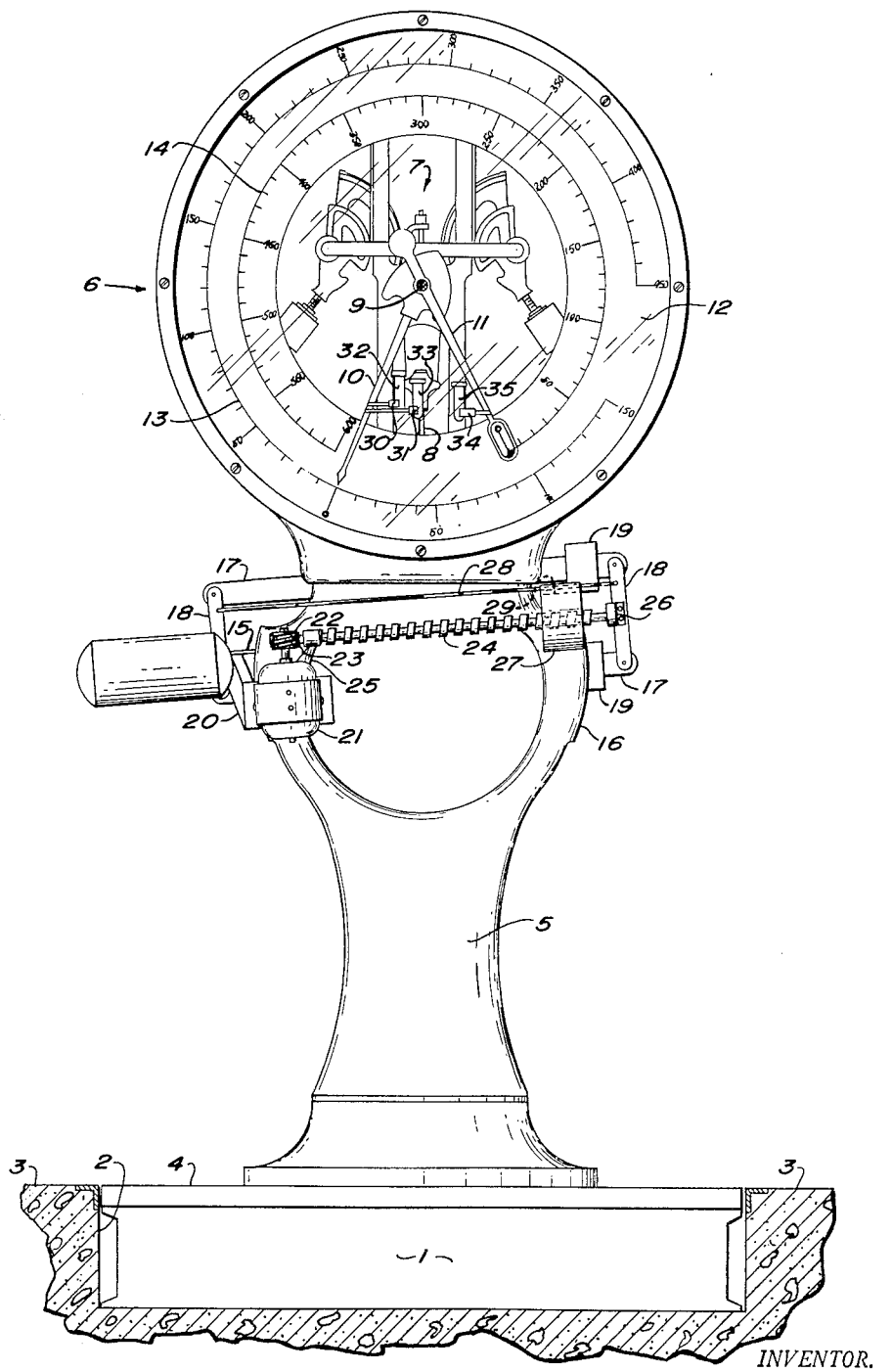
Fig. I
INVENTOR.
FRED W. GILCHRIST

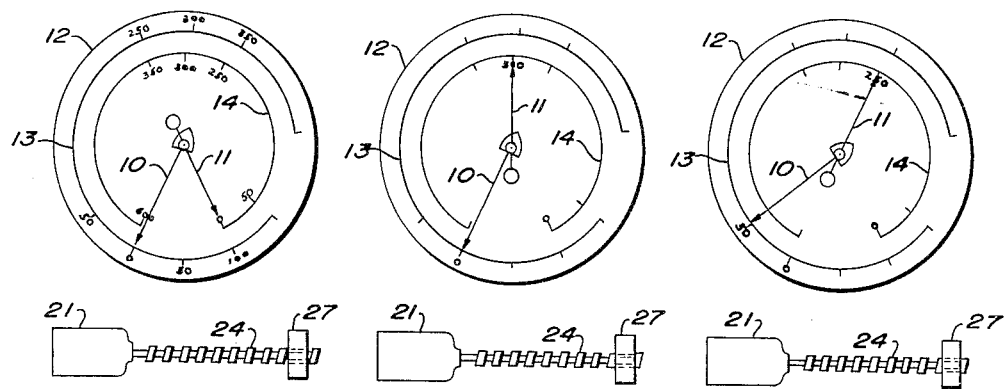
Fig.II  Fig.III  Fig.IV
Fig.V  Fig.VI  Fig.VII
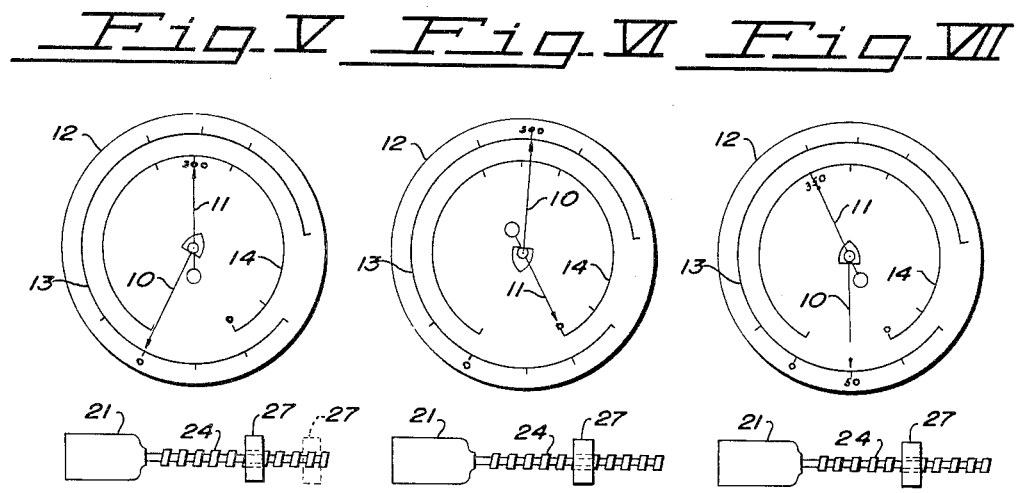
INVENTOR.
FRED W. GILCHRIST

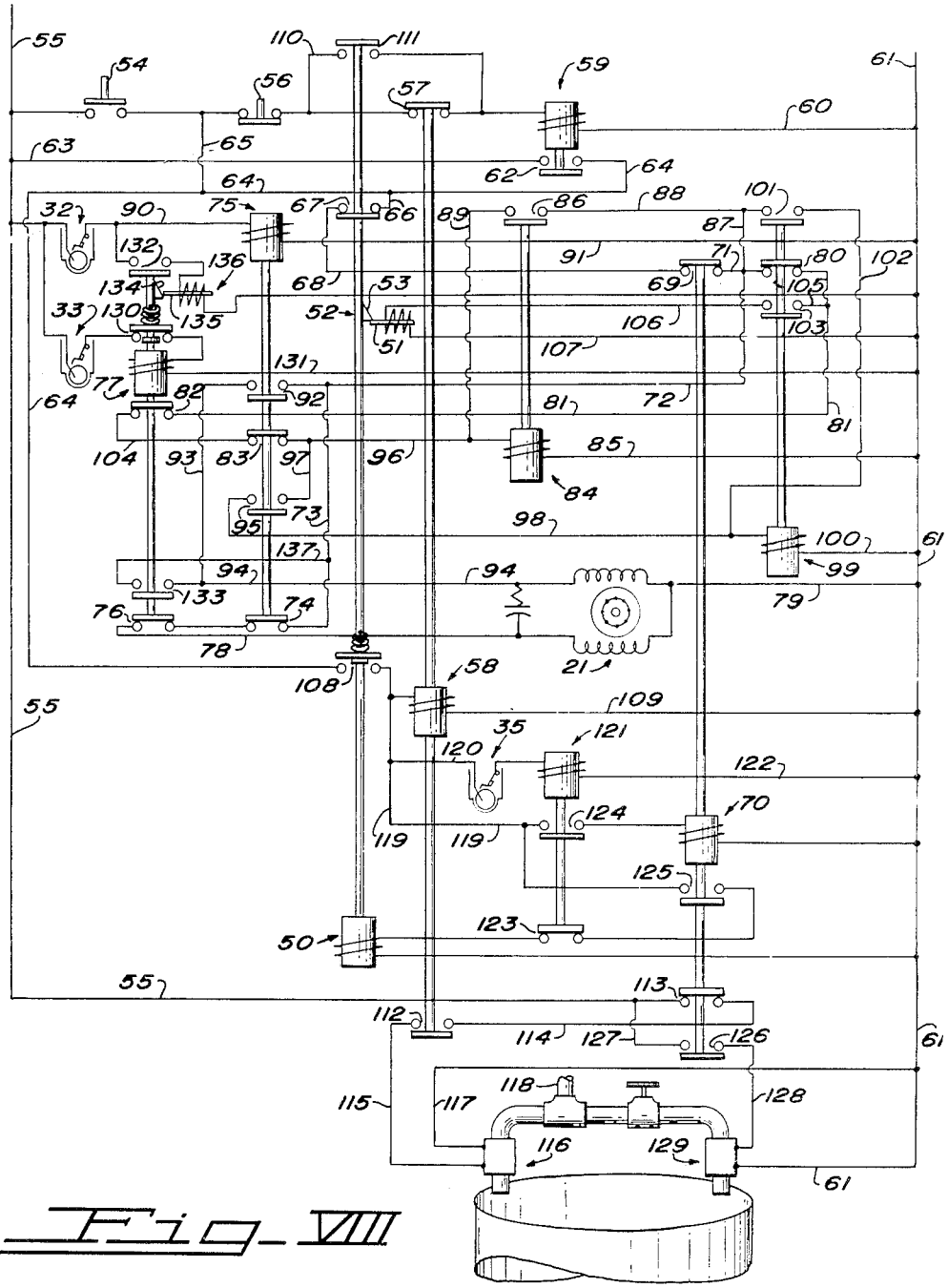
Fig. VIII
INVENTOR.
FRED W. GILCHRIST

2,746,708
AUTOMATIC TARE DEVICE

Fred W. Gilchrist, Toledo, Ohio, assignor to Toledo Scale Company, Toledo, Ohio, a corporation of New Jersey Application October 29, 1952, Serial No. 317,408

9 Claims. (Cl. 249—60)

This invention relates to weighing scales employed in filling containers with a predetermined amount of material, and in particular to a weighing scale adapted to display indications of the net weight of a material placed into a container, the tare weight of the container, and the gross weight of the container and material in the container.

This is a continuation-in-part of my application Ser. No. 262,769, filed December 21, 1951, and now abandoned.

The principal object of this invention is to provide a weighing scale with means for automatically offsetting the tare weights of empty containers and with additional means for displaying clear indications of the net weight of the material placed into the container, the tare weight of the container, and the gross weight of the container and the material contained therein.

Another object is the provision of improved indicating mechanism which shows the net weight of a commodity in a filled container while it is upon the scale and the tare weight of the container and the gross weight of the container and material after the filled container has been removed from the scale.

A further object is to provide a weighing scale having means for automatically compensating for the tare weight of empty containers and for controlling the feeding of material into containers.

Still another object of the invention is to show during the material feeding operation the amount by which the material in the container falls short of the desired amount.

Another object is to provide material feeding control means the operation of which commences automatically upon completion of the tare offsetting cycle.

Further objects and advantages will be apparent from the following description in which reference is had to the accompanying drawings illustrating a preferred form of the invention.

According to the invention, a weighing scale is provided with an annular chart having two concentric rows of indicia. Mounted on an indicator shaft and adapted to cooperate with the rows of indicia are a pair of indicators. One of the indicators is fixed onto the shaft and cooperates with one of the rows of indicia. The row with which the fixed indicator cooperates has graduations extending in opposite directions from a zero marking, the graduations extending in one direction being provided for indications of the net weight of a material placed into a container, and the graduations extending in the opposite direction being provided for indicating the tare weight of the container. The second indicator is clutched onto the indicator shaft and cooperates with the other row of indicia to provide indications of the gross weight of the material and the container.

In the drawings:

Figure I is a front elevational view of a weighing scale embodying the invention.

Figures II through VII are simplified views of the scale head and tare offsetting mechanism which illustrate the various positions of the indicators and the poise during the several stages of operation of the invention.

Figure VIII is a schematic wiring diagram of the tare offsetting and material feeding control means.

These specific figures and the accompanying description are intended merely to illustrate the invention but not to limit its scope.

In the preferred embodiment of the invention, a base 1 is positioned in a pit 2 recessed in a floor 3. A load receiver or platform 4 is supported by load supporting mechanism (not shown) in the base 1 with its top generally even with the floor level to facilitate placing containers such as oil drums onto the load receiver 4. A hollow column 5 surmounts the rear portion of the base 1 and is surmounted by a watchcase-shaped dial housing 6. Automatic load counterbalancing mechanism 7 is mounted within the dial housing 6 and is operatively connected to the load receiver 4 through a lever system (not shown) by a steelyard rod 8. The load counterbalancing mechanism 7 shown in Figure I is so arranged that when the scale is in balance, the load counterbalancing mechanism may move either positively or negatively from no load position. An indicator shaft 9 which is rotatable in response to movements of the automatic load counterbalancing mechanism carries a fixed indicator 10 and a clutched indicator 11. A circular chart 12 has a row 13 of indicia extending circumferentially near the periphery of the chart. The row 13 of indicia is graduated in opposite directions from a zero marking and cooperates with the fixed indicator 10. As will be more fully described later, readings of the net weight of a material placed into a container may be viewed on the graduations extending clockwise from zero, and readings of the tare weight of the container may be viewed on the graduations extending counterclockwise from zero.

A second row 14 of indicia on the chart 12 is spaced from the row 13 and is concentric therewith. The second row 14 of indicia cooperates with the clutched indicator 11 and is graduated from zero in a counterclockwise direction as viewed in Figure I. Gross weight readings of a container and the material contained therein may be viewed on the second row of indicia as will be shown later. The primary purpose of the second row of indicia, however, is for setting the predescribed amount of material which is desired to be placed into a container. A tare lever 15, which is a portion of the lever system of the scale, is mounted through an upper windened portion 16 of the hollow column 5. A pair of graduated beams 17 are mounted to the rear of the widened portion 16 of the column 5 on brackets 18 fastened to the ends of the tare lever 15. A hand manipulable poise 19 is mounted on each of the beams 17 to provide manual tare offsetting means. In the operation of the instant invention, the poises 19 are not used. They are provided for using the scale in a normal manner.

A forwardly extending bracket 20 mounted from the left end of the tare lever 15 acts as a support for a reversible motor 21 which carries on its shaft a worm gear 22 which cooperates with a worm 23 carried on the end of a generally horizontal drive screw 24. The drive screw 24 in the instant invention serves as a tare beam. The drive screw is supported by an arm 25 extending upwardly from the motor 21 and a second arm 26 extending forwardly from the right end bracket 18. A poise 27 is threaded on the screw 24 and is adapted to be positioned along the screw in one direction or the other as the screw is rotated in response to operation of the motor 21. A rod 28 mounted from the brackets 18 and parallel to the drive screw 24 engages in a longitudinal slot 29 in the poise 27 to prevent the poise from being rotated by the screw 24 when it is being positioned along the screw.

Mounted on the indicator 10 are a pair of magnets 30 and 31 which cooperate with a zero mercury-magnetic switch 32 and a behind-zero mercury-magnetic switch 33 respectively to provide control means for offsetting the tare weight of a container placed on the load receiver 4. Carried near the end of the clutched indicator 11 is a long magnet 34 which together with a mercury-magnetic feed-cutoff switch 35 forms the control means for the feeding of material into a container. The mercury-magnetic switches are all adjustably mounted on the framework of the weighing scale.

The mercury-magnetic feed-cutoff switch 35 is mounted near the zero marking of the second row 14 of indicia. The purpose of using the long magnet 34 carried by the indicator 11 is to control the material feed so as to permit feeding to take place rapidly until the largest portion of the predetermined amount of material is in the container and to slow the feeding near the end of the filling operation as the magnet first operates the switch, and then to cut off the material flow as the long magnet 34 passes the switch 35. The switch 35 is so mounted as to be operated by the magnet 34 to stop material flow when the material in the container has reached the desired amount.

Figures II through VII illustrate the various positions of the indicators 10 and 11 and the poise 27 during the several operations of the weighing scale embodying the invention.

Figure II shows the indicators each at zero on their respective rows of indicia when there is no load on the platform. The poise 27 which is positionable by the motor 21 is to the right on the drive screw 24.

In Figure III, the clutched indicator 11 has been adjusted to align with a marking corresponding to the desired net load of material to be placed into the container (in this instance, it is desired to fill a container with 300 pounds of material).

When the container (shown in Figure IV as weighing 50 pounds) is placed on the platform, the indicators will both move clockwise, the indicator 10 showing the weight of the container on the row 13 of indicia. The graduation cooperating with the indicator 11 is of no consequence at this time, and the poise 27 remains to the right on the screw 24.

The automatic tare offsetting mechanism is set into operation after the scale mechanism has come to rest with the empty container on the load receiver to cause the load counterbalancing mechanism to move the indicator 10 back toward zero as is shown in Figure V. This is accomplished by depressing a start button on a control panel (not shown) to permit current to flow to the automatic tare offsetting controls and thereby cause the motor 21 to position the poise 27 to the left on the screw 24 so as to counterbalance the tare weight of the container and return the indicator 10 to zero. It will be noticed that the poise 27 after having been moved to offset the weight of the 50 pound container, has been positioned to the left approximately across one-third of the length of the screw 24. The poise 27 is adapted to counterbalance approximately 150 pounds by its moving from the right end to the left end of the screw 24. This corresponds to that portion of the row 13 of indicia which extends from zero in a counterclockwise direction. When the indicator 10 arrives at zero after the tare weight of the empty container has been offset, the clutched indicator 11 will again assume the position of its predetermined setting, in this case 300 pounds.

Material then is rapidly fed into the container and the weighing mechanism causes the indicators 10 and 11 to rotate clockwise on the indicator shaft 9. During the feeding operation, the indicator 10 will show the amount of material already in the container, and the indicator 11 will show the amount by which the material in the container falls short of the desired net load. As the clutched indicator 11 approaches the zero marking on the row 14 of indicia, the long magnet 34 operates the mercury-magnetic switch 35 to cause the material to be fed at a dribble rate until the indicator 11 arrives at zero. When the indicator 11 reaches zero the long magnet 34 moves out of range of operation of the switch 35, and the material flow is cut off. At this point the indicators assume the positions shown in Figure VI, with the indicator 10 showing the net weight of material in the container on that portion of the row 13 of indicia extending clockwise from zero.

The filled container is then removed from the load receiver 4 and the indicators assume the positions shown in Figure VII. The indicator 10 shows the tare weight of the container, and the indicator 11 shows the gross weight of the container and the material contained therein.

Should the next empty container be of a different weight from the first container, as is often the case, the operations will be as follows.

If the second container weighs, for example, 54 pounds, or 4 pounds more than the first container, when it is placed upon the load receiver, the indicator 10 will move from the position shown in Figure VII a distance clockwise corresponding to the tare weight of the container. The indicator 10 will in this case register with the 4 pound graduation on that portion of the row 13 of indicia extending clockwise from zero. The depression of the start button to set the automatic tare offsetting controls into operation will cause the same sequence of operations to take place as in Figures V through VII. The poise 27 in this case will move a short distance more to the left to counterbalance 54 pounds. After the 54 pound container has been removed from the load receiver 4, the indicator 10 will register with the 54 pound marking for the tare weight of the container and the indicator 11 will register the 354 pound marking, or tare weight of 54 pounds for the container plus 300 pounds of material placed therein.

If, however, the second container weighs less than the first container, for example 46 pounds, when the empty container is placed upon the load receiver, the indicator 10 will move clockwise from the position shown in Figure VII a distance equal to 46 pounds. The indicator 10 thus registers with the 4 pound marking on that portion of the row 13 of indicia extending counterclockwise from zero. When the tare offsetting control means is set into operation, the poise 27 is moved slightly to the right on the screw 24 until it counterbalances 46 pounds on the load receiver and the indicator 10 moves clockwise until it registers with zero. The operations thereafter will proceed as previously described, and the tare weight indication after the container has been removed will show 46 pounds, and the gross weight will show 346 pounds.

Where the same net weight of material is desired to be placed into the container, the operations of the tare offsetting means and the feed control will be entirely automatic by merely pressing the start button on the control panel. If, after a certain number of weighings it is desired to fill the containers with a different predetermined amount of material, the clutch indicator 11 may be adjusted as follows. With no load on the receiver, the tare offsetting mechanism is set into operation so as to cause the motor to drive the poise 27 to the right on the drive screw 24 to return the indicator 10 to zero. At this point, the clutched indicator 11 may be adjusted so as to align with a marking on the row 14 of indicia corresponding to the new desired net load.

The wiring diagram for the automatic tare off-setting controls and the material feeding and cutoff controls is illustrated in Figure VIII.

After an empty container has been placed upon the load receiver of the scale and the indicators are in the positions shown in Figure IV, the tare offsetting cycle proceeds as follows. To begin with, a latch closing relay 50 has been previously latched by the armature 51 of a latch release relay 52 which engages a latch 53 of the relay 50. The tare offsetting cycle commences as a start button 54 is depressed to permit current to flow through a power lead 55, through the start button 54, a stop button 56, normally closed contacts 57 of a relay 58, to the coil of a relay 59, through a lead 60, and then through a return lead 61 to the opposite side of the line. Energization of the relay 59 closes its normally open contacts 62 and holds the relay 59 energized by a flow of current through the lead 55, a lead 63, the now closed contacts 62, a lead 64, a lead 65, the stop button 56, the closed contacts 57, the coil of the relay 59 and then through the lead 60 and the opposite side of the line. The reversible motor 21 is actuated to position the poise 27 to the left on the drive screw 24 by a flow of current through the leads 55 and 63, the closed contacts 62, the leads 64, a lead 66, a pair of closed contacts 67 of the latched-in relay 50, a lead 68, a pair of closed contacts 69 of a relay 70, a lead 71, a branch lead 72, a lead 73, closed contacts 74 of a relay 75, closed contacts 76 of a latch closing relay 77, a lead 78 to the motor 21 and then through a lead 79 and the return lead 61. At the same time current flows through the line leading to contacts 69, the lead 71, a pair of closed contacts 80, a lead 81, a pair of closed contacts 82 of the relay 77, a pair of closed contacts 83 of the relay 75 to the coil of a relay 84, and then through a lead 85 and the return lead 61. Energization of the relay 84 closes its normally open contacts 86 and permits current to flow through the lead 68, the contacts 69, the lead 71, a branch lead 87, a lead 88, the closed contacts 86, a lead 89, to the coil of the relay 84 to hold the relay 84 energized. The poise 27 will be positioned to the left on the screw 24 to counterbalance the weight of the empty drum so as to return the indicator 10 counterclockwise toward zero.

As the mercury-magnetic switch 32 is closed by the magnet 30 when the indicator 10 reaches zero, current flows from the power lead 55 through the switch 32, a lead 90, a coil of the relay 75, then through a lead 91 and the opposite side of the line. Energization of the relay 75 opens the normally closed contacts 74 to stop current flow to the motor 21 and closes immediately thereafter a set of normally open contacts 92 which permits current to now flow through the leads 55 and 63, the contacts 62, the leads 64 and 66, the contacts 67, the lead 68, the contacts 69, the leads 71 and 72, the contacts 92, a lead 93, and a lead 94 to the motor 21 to operate the motor in reverse.

When the relay 75 was energized it also opened its contacts 83 and closed its contacts 95. Closing of the contacts 95 permits current to flow through the lead 68, contacts 69, the leads 71, 87, and 88, the contacts 86, leads 89, 96, and 97, the now closed contacts 95 of the relay 75, a lead 98, to the coil of a relay 99, and then through a lead 100 and the opposite side of the line. Energization of the relay 99 closes its contacts 101 to permit the current to flow through the lead 68, the contacts 69, the leads 71, 87, and 88, the now closed contacts 101, a lead 102 to the coil of the relay 99 and then through the lead 100 and the opposite side of the line, to hold the relay 99 energized. The contacts 80 were opened and a set of contacts 103 were closed momentarily afterward when the relay 99 was first energized.

Reversal of the motor 21 carries the indicator, which has moved slightly counterclockwise of zero, to be positioned back toward zero by moving the poise 27 slightly to the right on the screw 24. Just as the indicator 10 arrives at zero, the magnet 30 moves out of position whereby it closed the mercury-magnetic switch 32. As the switch 32 opens, it breaks current flow to the coil of the relay 75, and de-energizes the relay. De-energization of the relay 75 opens the contacts 92 and stops current flow to the motor 21. Before the contacts 74 of the relay 75 closed to operate the motor in reverse again, the contacts 95 open and the contacts 83 close. Closing of the contacts 83 permits current to flow through the lead 68, the contacts 69, the leads 71, 87 and 88, the closed contacts 86, the leads 89 and 96, the normally closed contacts 83 of the de-energized relay 75, a lead 104, the closed contacts 82 of the latch-closing relay 77, the leads 81 and 105, the closed contacts 103 of the energized relay 99, a lead 106, to the coil of the latch release relay 52, and then through a lead 107 and the return lead 61. Energization of the latch release relay 52 causes the armature 51 to release the latch 53 of the latch-closing relay 50. The contacts 67 of the latch-closing relay 50 open to break current flow to the held-in relays 84 and 99. The indicator 10 is now at the zero marking on the row of indicia 13 and the poise 27 is positioned along the drive screw 24 to offset the tare weight of the container.

Momentarily after the contacts 67 open, a set of slow moving contacts 108 of the latch-closing relay 50 closes and permits current to now flow through the leads 55 and 63, the closed contacts 62, the leads 64, the contacts 108, to the coil of the relay 58 and then through a lead 109 and the opposite side of the line. Eneregization of the relay 58 opens its contacts 57 through which current flows to the coil of the relay 59, but the relay 59 is held energized by current flowing through a lead 110, a set of closed contacts 111 of the de-energized relay 50 and then to the coil of the relay 59. A set of normally open contacts 112 are closed when the relay 58 is energized, and current now flows through the lead 55, a set of normally closed contacts 113 of the relay 70, a lead 114, the now closed contacts 112, a lead 115, the coil of a fast-feed solenoid-operated valve 116, and then through a lead 117 and the return lead 61. When the coil of the valve 116 is energized, the material is rapidly fed into the container through a supply pipe 118 and then through the fast-feed valve 116. The indicators will then move clockwise from the position shown in Figure V toward the position shown in Figure VI. The indicator 10 will indicate the amount of material in the container as the material is fed into the container and the indicator 11 which is moving clockwise toward the zero marking on the row of indicia 14 will show the amount by which the material in the container falls short of the desired net load.

When the indicator 11 is near zero with the container almost filled with the desired net load of material, the long magnet 34 carried on the indicator 11 operates the mercury-magnetic switch 35 to close the switch. Current may now flow through the leads 64, the closed contacts 108, a lead 119, a branch lead 120, the closed mercury-magnetic switch 35, to the coil of a relay 121, and then through a lead 122 and the opposite side of the line. Energization of the relay 121 opens its contacts 123 and closes its contacts 124. When the contacts 124 close, current flows through the lead 119, the closed contacts 124 to the coil of the relay 70 to energize the relay. When the relay 70 is energized it breaks its contacts 69 and 113 and closes its contacts 125 and 126. Opening of the normally closed contacts 113 stops current flow to the coil of the fast-feed valve 116 and shuts off the supply of material through that valve. Closing of the contacts 126 causes current to flow through the lead 55, a lead 127, the now closed contacts 126, a lead 128, the coil of a slow feed solenoid-operated valve 129 and then through the return lead 61. Energizing the coil of the valve 129 causes material flow from the supply pipe to be regulated by that valve and material is fed at a slow or dribble speed into the container for the remainder of the material feeding operation. As the indicator 11 arrives at the zero marking, on the row 14 of indicia, the long magnet 34 moves out of range of the mercury-magnetic switch 35 to open the switch and de-energize the relay 121.

De-energization of the relay 121 opens its contacts 124 and closes its contacts 123. Closing of the contacts 123 causes current to flow through the lead 119, the closed contacts 125, the closed contacts 123 to the coil of the latch closing relay 50 to energize the relay 50 and have its latch 53 catch on the armature 51 of the latch relay 52. Opening of the contacts 124 de-energizes the relay 70 whereupon the contacts 126 open and current flow to the coil of the slow-feed valve is cut off. Material fed into the container is stopped and the desired net load of material in the container has been reached.

When the latch-closing relay 50 was energized its contacts 111 were opened breaking current flow to the relay 59. The slow moving contacts 108 of the relay 50 were held closed momentarily when the contacts 111 were opened to permit current to keep the relay 58 energized and have its contacts 57 open at the same time the contacts 111 were open. Current cannot therefore be bypassed again to the relay 59 around the contacts 111. De-energization of the relay 59 opens its contacts 62 and current flow through lead 64 to the feeding controls is completely cut off. With the relay 58 and the relay 70 de-energized, current cannot flow through either of the contacts 112 or 126.

After the flow of material has ceased, the indicator 10 will align with a marking on the row of indicia 13 indicative of the amount of material in the container. The container is then removed and the indicators 10 and 11 rotate counterclockwise, the indicator 10 showing the tare weight of the container and the indicator 11 showing the gross weight of the container and the material in the container (see Figure VII).

As the indicators 10 and 11 were rotated counterclockwise when the container was removed from the scale, the magnet 34 closed the mercury-magnetic switch 35 but it was of no consequence since the contacts 108 of the latched-in relay 50 were open. When the mercury-magnetic switch 32 was closed by the magnet 30, the relay 75 was again energized and its contacts 92 and 95 were closed and 74 and 83 were opened. The mercury-magnetic switch 33 which is on the counterclockwise side of the switch 32 a short distance was also operated by its magnet 31, and current flowed through the power lead 55, the switch 33, a set of slow moving contacts 130 of the latch closing relay 77 to the coil of the relay 77 and then through a lead 131 and the opposite side of the line. Energization of the relay 77 opens its contacts 76 and 82 and closes its contacts 132 and 133. The slow moving contacts 130 are provided to allow the relay 77 to be energized long enough to have its latch 134 catch on an armature 135 of a latch release relay 136.

If a second container which is to receive material weighs less than the first (e. g. 46 pounds), the indicator 10 will register with the 4 pound marking counterclockwise of zero on the row of indicia 13 when the container is placed upon the load receiver. The start button 54 is then depressed to begin the tare offsetting and material feeding cycle. When the start button 54 was depressed the relay 59 became energized to close its contacts 62 which holds it energized. Current flows through the leads 55 and 63 to the contacts 62, leads 64 and 66, contacts 67, lead 68, contacts 69, leads 71, 72, 73, and a branch lead 137, the closed contacts 133 of the latched-in relay 77, then through the lead 94 to operate the motor 21 to position the poise 27 along the screw 24 to drive the indicator clockwise towards zero. As the indicator approaches zero, the magnet energizes the behind zero mercury-magnetic switch 33, but since the contacts 130 of the latched-in relay 77 are open, the closing of the switch 33 is of no consequence. Just before the indicator 10 arrives at zero, the magnet 30 closes the mercury-magnetic switch 32 and current flows through the closed contacts 132 of the latched-in relay 77 to the coil of the latch release relay 136 to energize the release relay and have its armature 135 release the latch 134. The relay 77 returns to its normal de-energized position. Contacts 133 of the relay 77 open to stop current flow to the motor 21, through the leads 73 and 137 and the contacts 133.

When the mercury-magnetic switch 32 was closed, the relay 75 was also energized to open its contacts 74 and 83 and close its contacts 92 and 95. Closing of the contacts 92 causes current to flow to the motor 21 through the leads 71 and 72, closed contacts 92, and leads 93 and 94, and the motor 21 continues to operate to drive the indicator 10 clockwise. As the magnet 30 carried on the indicator 10 moves clockwise, it moves out of range of operation of the zero mercury-magnetic switch 32 to open the switch and de-energize the relay 75. De-energization of the relay 75 opens the contacts 92 to break current flow to the motor 21 through the leads 93 and 94, and at the same time closes contacts 74 and 83. The closing of the contacts 74 causes current to flow through the leads 72 and 73, the closed contacts 74 and 76, and the lead 78 to the motor 21 to reverse the motor and cause the indicator 10 to now be rotated counterclockwise. The closing of contacts 83 allows current to flow from the lead 71 through the closed contacts 80 of the relay 99, through the lead 81, closed contacts 82 and 83, the lead 96, to energize the relay 84. The relay 84 holds itself energized by closing its contacts 86 as described during the tare offsetting operation of the first container.

Before the indicator reversed its direction of rotation, it slightly overshot the zero marking while moving clockwise. It is preferred, should a second container be lighter than the first when the tare offsetting controls are operated, that the indicator move clockwise slightly past zero, then be reversed to move counterclockwise, and then again be reversed to move clockwise and stop at zero. The controls are so arranged that the mercury-magnetic switch 32 be arranged to stop the tare offsetting operation when the switch 32 opens after the indicator has approached from a counterclockwise direction. This provision allows the indicator 10 to coast a certain distance clockwise after the switch 32 is closed. The indicator 10, after the tare offsetting operation, will always stop at zero.

The indicator 10 which had moved slightly past zero and which was then reversed to be driven slightly counterclockwise, positions the magnet 30 to close the mercury-magnetic switch 32 again. Relay 75 is again energized, opening its contacts 83 and 74 and closing its contacts 92 and 95. The opening of the contacts 74 stops current flow to the motor 21 and the closing of the contacts 92 causes current to flow to the other side of the motor 21, reversing the motor and again causing it to move the indicator 10 clockwise toward zero. The relay 99 becomes energized when the contacts 95 of the relay 75 closes and the relay 99 is held energized as mentioned in the first tare offsetting. As the indicator 10 moves clockwise in response to the positioning of the poise 27 by the motor 21, the relay 75 is de-energized when the magnet 30 permits the switch 32 to open and the tare offsetting is completed as was first described when the latch release relay 52 is finally energized. Energization of the latch release relay 52 permits current to flow through the contacts 108 of the latch closing relay 50 to the material feeding controls, and material feeding takes place as before.

When this second container is removed from the scale, the indicator 10 will register with the 46 pound marking for the tare weight indication and the indicator 11 will register with the 346 pound marking for the gross weight indication.

If the second container weighs more than the first 50 pound container, e. g. 54 pounds, placing of this heavier container on the load receiver would cause the indicator to register with a 4 pound marking on the graduations extending clockwise from zero on the row of indicia 13. When the start button 54 is depressed the controls for the tare offsetting and the material feeding are identical with that described for the first container. The motor will drive the poise 27 to move the indicator 10 counterclockwise, and upon closing the zero mercury-magnetic switch 32, will reverse the motor to move the indicator 10 clockwise and to stop the indicator at zero.

Subsequent operations will follow as previously described, the determining factor being whether the container weighs more or weighs less then the preceding container.

The embodiment of my invention herein shown and described is to be regarded as illustrative only and it is to be understood that the invention is susceptible to variation, modification, and change within the spirit and scope of the subjoined claims.

Having described the invention, I claim:

1. In a weighing scale having a load receiver, an automatic load counterbalancing mechanism operatively connected to the load receiver, and a tare beam and cooperating poise operatively connected to the load receiver to supplement the automatic load counterbalancing mechanism, in combination, an indicator shaft operatively connected to the automatic load counterbalancing mechanism, a pair of indicators, one of the indicators being fixed to the indicator shaft and the other being clutched on the indicator shaft so as to be adjustable thereon, a chart, a first row of indicia on the chart cooperating with the fixed indicator, the first row of indicia having graduations extending in opposite directions from a zero indicium, said graduations extending in one direction from zero being for net weight indication of a load placed upon the load receiver and said graduations extending in the opposite direction from zero being for tare weight indication of a load placed upon the load receiver, and a second row of indicia on the chart concentric with the first row which second row is adapted to cooperate with the clutched indicator, said second row of indicia extending from a zero indicium in the direction in which the graduations for the tare weight indication extend and being adapted to provide gross weight indication when the load receiver is unloaded.

2. A weighing scale according to claim 1 wherein the clutched indicator may be adjusted to a predetermined setting on the second row of indicia corresponding to the desired net load to be added to the load receiver when the fixed indicator registers with the zero indicium on the first row of indicia and the poise counterbalances tare weight upon the load receiver.

3. A weighing scale according to claim 1 including means carried by the clutch indicator which controls the addition of load to the load receiver and which prevents further addition of any load when the clutched indicator arrives at the zero indicium on the second row of indicia.

4. In a weighing scale having a load receiver, an automatic load counterbalancing mechanism and a tare beam and poise that jointly counterbalance a load on the load receiver, in combination, an indicator shaft operatively connected to the automatic load counterbalancing mechanism, a pair of indicators, one of the indicators being fixed to the indicator shaft and the other being clutched on the indicator shaft so as to be adjustable thereon, a chart, a first row of indicia on the chart cooperating with the fixed indicator, the first row of indicia having graduations extending in opposite directions from a zero indicium, said graduations extending in one direction from zero being for indicating the magnitude of any load added to the load receiver and said graduations extending in the opposite direction from zero being for indicating, when the load receiver is unloaded, any load counterbalanced by the poise when the fixed indicator was registered with the zero indicium, and a second row of indicia on the chart cooperating with the clutched indicator and extending in the same direction as the graduations on the first row of indicia for indicating the load counterbalanced by the poise, said second row of indicia being for indicating, when the load receiver is unloaded, the gross weight of the load added to the load receiver.

5. A weighing scale according to claim 4 wherein the clutched indicator may be adjusted to a predetermined setting on the second row of indicia corresponding to the desired net load to be added to the load receiver when the fixed indicator registers with the zero indicium on the first row of indicia and the poise counterbalances tare weight upon the load receiver.

6. A weighing scale according to claim 4 including means carried by the clutched indicator which controls the addition of load to the load receiver and which prevents further addition of any load when the clutched indicator arrives at the zero indicium on the second row of indicia.

7. In a weighing scale having a load receiver, an automatic load counterbalancing mechanism operatively connected to the load receiver, and a tare beam and poise operatively connected to the load receiver to supplement the automatic load counterbalancing mechanism, in combination, an indicator shaft operatively connected to and driven by the automatic load counterbalancing mechanism, a pair of indicators, one of the indicators being fixed to the indicator shaft and the other being clutched on the indicator shaft so as to be adjustable thereon, a chart having a first and a second row of indicia, the rows of indicia being concentric, graduations extending in opposite directions from a zero indicium on the first row of indicia, the fixed indicator cooperating with the first row of indicia and the clutch indicator cooperating with the second row of indicia, said graduations extending in one direction from the zero indicium on the first row of indicia being for indicating the amount by which load on the load receiver exceeds the load offsetting effect of the poise and said graduations extending in the opposite direction from the zero indicium of the first row of indicia being for indicating the amount by which the load fails to equal the load offsetting effect of the poise, graduations on the second row of indicia extending from a zero indicium in the direction of extension of the graduations on the first row of indicia for indicating the amount by which the load fails to equal the load offsetting effect of the poise, said graduations on the second row of indicia being for indicating the total gross load upon the load receiver, whereby if the poise is set to offset the tare weight of a container upon the load receiver, the fixed indicator and the graduations extending in the first mentioned direction from the zero indicium on the first row of indicia indicate the net load in the container on the load receiver, the fixed indicator and the oppositely extending graduations on the first row of indicia indicate the tare weight of the container after the container is removed from the load receiver, and the clutched indicator and the second row of indicia indicate the gross weight of the container and the material after the filled container is removed from the load receiver.

8. A weighing scale according to claim 7 including load feeding control means responsive to the relative position of the clutched indicator and the second row of indicia.

9. A weighing scale according to claim 8 in which the load feeding control means comprises a magnetic switch mounted on the scale along the path of movement of the clutched indicator, and a magnet carried by the clutched indicator to actuate the magnetic switch, whereby the load is added to the load receiver rapidly until the indicator carries the magnet into range to operate the switch, the addition of load then proceeds slowly while the switch is in operation, and the load feeding is stopped when the magnet passes the switch.

References Cited in the file of this patent

UNITED STATES PATENTS

| | | |
|---|---|---|
| 1,210,204 | Reeves | Dec. 26, 1916 |
| 1,409,317 | Thomas | Mar. 14, 1922 |
| 1,768,855 | Moran | July 1, 1930 |
| 1,980,731 | Michener | Nov. 13, 1934 |
| 2,067,743 | Weckerly | Jan. 12, 1937 |
| 2,351,606 | Gold et al. | June 20, 1944 |
| 2,502,380 | Howard | Mar. 28, 1950 |